(12) United States Patent
Lo et al.

(10) Patent No.: US 9,531,929 B1
(45) Date of Patent: Dec. 27, 2016

(54) CAMERA MODULE AND METHOD FOR MANUFACTURING THE CAMERA MODULE

(71) Applicant: Cheng Uei Precision Industry Co., Ltd., New Taipei (TW)

(72) Inventors: Jui Hsiang Lo, New Taipei (TW); Yu Ting Shih, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/936,706

(22) Filed: Nov. 10, 2015

(30) Foreign Application Priority Data

Sep. 18, 2015 (TW) .............................. 104131052 A

(51) Int. Cl.
*H04N 5/225* (2006.01)
(52) U.S. Cl.
CPC ................................. *H04N 5/2254* (2013.01)
(58) Field of Classification Search
CPC ... H04N 5/2254; H04N 5/2253; H04N 5/2257
USPC ........................................................ 348/257
See application file for complete search history.

(56) References Cited

U.S. PATENT DOCUMENTS

| 6,842,585 B2 * | 1/2005 | Matsuo | G02B 7/28 257/712 |
| 2015/0229843 A1 * | 8/2015 | Shimizu | G03B 5/00 348/222.1 |

* cited by examiner

Primary Examiner — Tuan Ho
(74) Attorney, Agent, or Firm — Lin & Associates Intellectual Property, Inc.

(57) ABSTRACT

A camera module includes a main circuit board defining a nonopaque area, a lens socket, a lens assembly, a sub circuit board and an image-sensing chip. The lens socket is mounted on a top surface of the main circuit board. The lens assembly assembled in the lens socket, includes at least one imaging lens which makes an optical axis formed by the lens assembly penetrate through the nonopaque area. The sub circuit board is adhered to a bottom surface of the main circuit board and is electrically connected with the main circuit board. The image-sensing chip is fastened in and is electrically connected with the sub circuit board. The method for manufacturing the camera module is described hereinafter. Prepare a main circuit board. Prepare an image-sensing chip and a sub circuit board. Prepare a lens socket and a lens assembly.

18 Claims, 11 Drawing Sheets

CAMERA MODULE AND METHOD FOR MANUFACTURING THE CAMERA MODULE

CROSS-REFERENCE TO RELATED APPLICATION

The present application is based on, and claims priority form, Taiwan Patent Application No. 104131052, filed Sep. 18, 2015, the disclosure of which is hereby incorporated by reference herein in its entirety.

BACKGROUND OF THE INVENTION

1. Field of the Invention

The present invention generally relates to a camera module, and more particularly to a camera module applied in a portable electronic device and a method for manufacturing the camera module.

2. The Related Art

In order to cater to a consumer market demand, a portable electronic device need have more functions, and working hours and a cost of manufacturing the portable electronic device need be lowered. A camera module applied in the portable electronic device need be developed towards a miniaturized and modularized direction.

Referring to FIG. 9, a camera module 101 in a first prior art includes a circuit board 201, a lens assembly 301 disposed on a top surface of the circuit board 201, and a light-sensing chip 501 assembled between the lens assembly 301 and the circuit board 201. A package layer 502 is formed outside the light-sensing chip 501 by a chip scale package technology. The package layer 502 together with the light-sensing chip 501 is soldered on the circuit board 201 by a surface mount technology. The package layer 502 is a ceramic package layer or a plastic package layer. The lens assembly 301 includes a lens socket 304, at least one imaging lens 302 mounted to a top end of the lens socket 304, and a filter 303 disposed between the imaging lens 302 and the light-sensing chip 501.

Though a total height $H_1$ of the camera module 101 is wished to be minimized, a height $h_3$ between a top end of the imaging lens 302 and a top surface of the light-sensing chip 501 must be kept in a predetermined height on account of an optical design limitation of the lens assembly 301. The total height $H_1$ of the camera module 101 depends on a height $h_4$ between a bottom surface of the camera module 101 and the top surface of the light-sensing chip 501. The light-sensing chip 501 has the package layer 502 that makes the total height $H_1$ of the camera module 101 hardly decreased.

Referring to FIG. 10, a camera module 102 in a second prior art includes a circuit board 202, a lens assembly 305 disposed on a top surface of the circuit board 202, a light-sensing chip 503 assembled between the lens assembly 305 and the circuit board 202, and a bearing seat 504. In order to decrease a height $h_5$ between a bottom surface of the camera module 102 and a top surface of the light-sensing chip 503, a bottom of the bearing seat 504 defines a recess 505, and the light-sensing chip 503 is assembled in the recess 505 of the bearing seat 504. The light-sensing chip 503 together with the bearing seat 504 is mounted to the circuit board 202. Though a total height $H_2$ of the camera module 102 is decreased, the camera module 102 still hardly satisfies a thickness requirement of the current portable electronic device.

Referring to FIG. 11, a camera module 103 in a third prior art includes a circuit board 203, a lens assembly 306 disposed on a top surface of the circuit board 203, and a light-sensing chip 506 assembled between the lens assembly 306 and the circuit board 203. In order to further decrease a height $h_6$ between a bottom surface of the camera module 103 and the top surface of the light-sensing chip 506, the circuit board 203 defines an opening 204, and the light-sensing chip 506 is received in the opening 204. However, though a total height $H_3$ of the camera module 103 is decreased, the light-sensing chip 506 is just adhered to a periphery wall of the opening 204 of the circuit board 203, so the light-sensing chip 506 easily breaks away from the circuit board 203 when an external force is exerted on the camera module 103. If a retaining block 307 is disposed under the light-sensing chip 506 for preventing the light-sensing chip 506 breaks away from the circuit board 203 when the external force is exerted on the camera module 103, the total height $H_3$ of the camera module 103 will be increased.

SUMMARY OF THE INVENTION

An object of the present invention is to provide a camera module and a method for manufacturing the camera module. The camera module includes a main circuit board, a lens socket, a lens assembly, a sub circuit board and an image-sensing chip. The main circuit board defines a nonopaque area. The lens socket is mounted on a top surface of the main circuit board and covers the nonopaque area. The lens assembly is assembled in the lens socket. The lens assembly includes at least one imaging lens which makes an optical axis formed by the lens assembly penetrate through the nonopaque area. The sub circuit board is adhered to a bottom surface of the main circuit board and electrically connected with the main circuit board. The image-sensing chip is fastened in and is electrically connected with the sub circuit board. The image-sensing chip is located at the optical axis.

The method for manufacturing the camera module is described hereinafter. Prepare a main circuit board. The main circuit board defines a nonopaque area. Prepare an image-sensing chip and a sub circuit board. The image-sensing chip is mounted to and is electrically connected with the sub circuit board. The sub circuit board is adhered to a bottom surface of the main circuit board and is electrically connected with the main circuit board. The image-sensing chip is corresponding to the nonopaque area. Prepare a lens socket and a lens assembly. The lens assembly is assembled in the lens socket. The lens socket is mounted to a top surface of the main circuit board to make an optical axis formed by the lens assembly pass through the nonopaque area.

As described above, the main circuit board is disposed between the lens assembly and the image-sensing chip of the camera module, so a total height H of the camera module is decreased. As a result, the camera module easily satisfies a thickness requirement of the current portable electronic device. Furthermore, the image-sensing chip is fastened in and is electrically connected with the sub circuit board by a wire bonding technology, so that the image-sensing chip is firmly mounted to the camera module.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
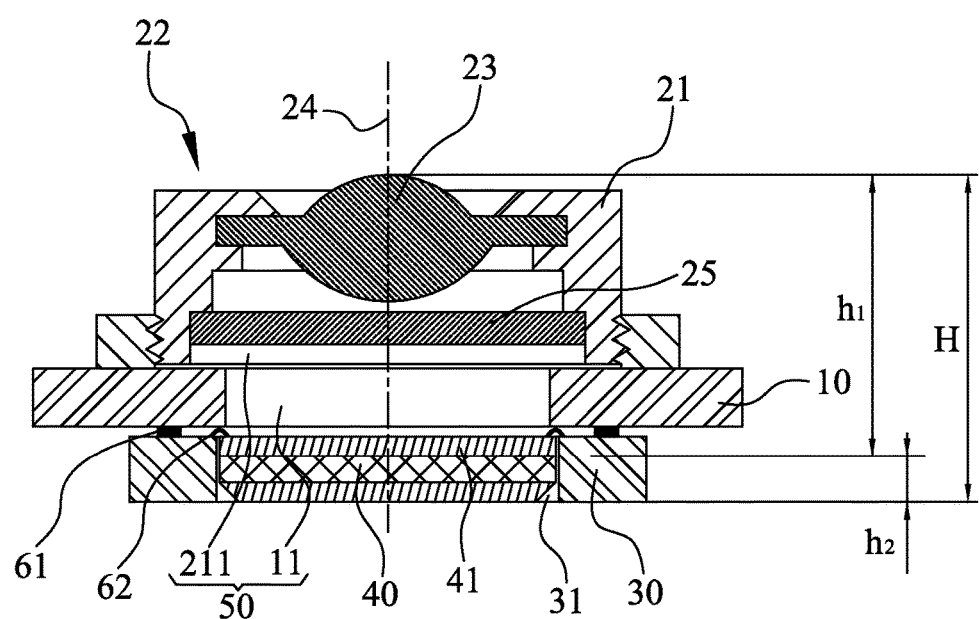
FIG. 1 is a sectional view of a camera module in accordance with a first embodiment of the present invention.

With reference to FIG. 1, a camera module 100 in accordance with a first embodiment of the present invention is shown. The camera module 100 in accordance with the first embodiment of the present invention includes a main circuit board 10, a lens socket 21, a lens assembly 22, a sub circuit board 30 and an image-sensing chip 40. The main circuit board 10 defines a nonopaque area 11. The lens socket 21 is mounted on a top surface of the main circuit board 10 and covers the nonopaque area 11. The lens assembly 22 is assembled in the lens socket 21. The lens assembly 22 includes at least one imaging lens 23 which makes an optical axis 24 formed by the lens assembly 22 penetrate through the nonopaque area 11. The sub circuit board 30 is adhered to a bottom surface of the main circuit board 10 and is electrically connected with the main circuit board 10. The image-sensing chip 40 is fastened in and is electrically connected with the sub circuit board 30. The image-sensing chip 40 is located at the optical axis 24.

Referring to FIG. 1, a height $h_1$ between a top point of the lens assembly 22 and a top surface of the image-sensing chip 40 need maintain a predetermined height on account of an optical design limitation of the lens assembly 22, so the main circuit board 10 is disposed between the lens assembly 22 and the image-sensing chip 40 for effectively decreasing a height $h_2$ between a bottom surface of the camera module 100 and the top surface of the image-sensing chip 40. So a total height H of the camera module 100 is decreased. So the camera module 100 easily satisfies a thickness requirement of a current portable electronic device (not shown).

Referring to FIG. 1, in the first embodiment, the main circuit board 10 is of a hollow frame shape. The nonopaque area 11 is a perforation defined in a middle of the main circuit board 10. The camera module 100 further includes a filter 25 disposed inside the lens socket 21. The filter 25 is disposed on the optical axis 24 formed by the lens assembly 22, so light beams through the lens assembly 22 will firstly pass through the filter 25, and then reach the image-sensing chip 40 for further improving an imaging quality. The filter 25 is without being limited to be disposed inside the lens socket 21. Specifically, the lens socket 21 defines a receiving chamber 211 penetrating through a top surface and a bottom surface of the lens socket 21. When the lens socket 21 is mounted on the top surface of the main circuit board 10, the receiving chamber 211 is communicated with the nonopaque area 11 to form an accommodating space 50. The imaging lens 23 is received in the receiving chamber 211 with a top of the imaging lens 23 projecting beyond the top surface of the lens socket 21. The filter 25 is received in the receiving chamber 211 of the accommodating space 50 and is located under the imaging lens 23. The filter 25 is spaced from the top surface of the main circuit board 10.

Figure 2:
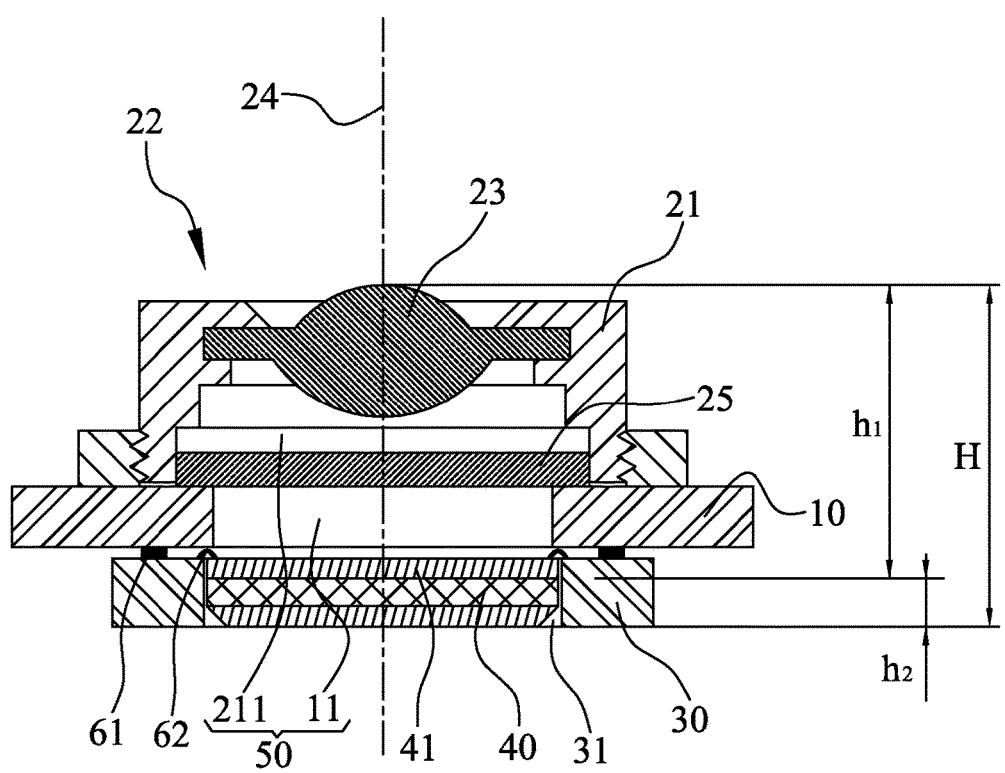
FIG. 2 is a sectional view of a camera module in accordance with a second embodiment of the present invention.

Referring to FIG. 2, a camera module 100 in accordance with a second embodiment of the present invention is shown. A difference between the first embodiment and the second embodiment is described as follows. The filter 25 is adhered to the top surface of the main circuit board 10, so the light beams through the lens assembly 22 are capable of passing through the filter 25.

Figure 3:
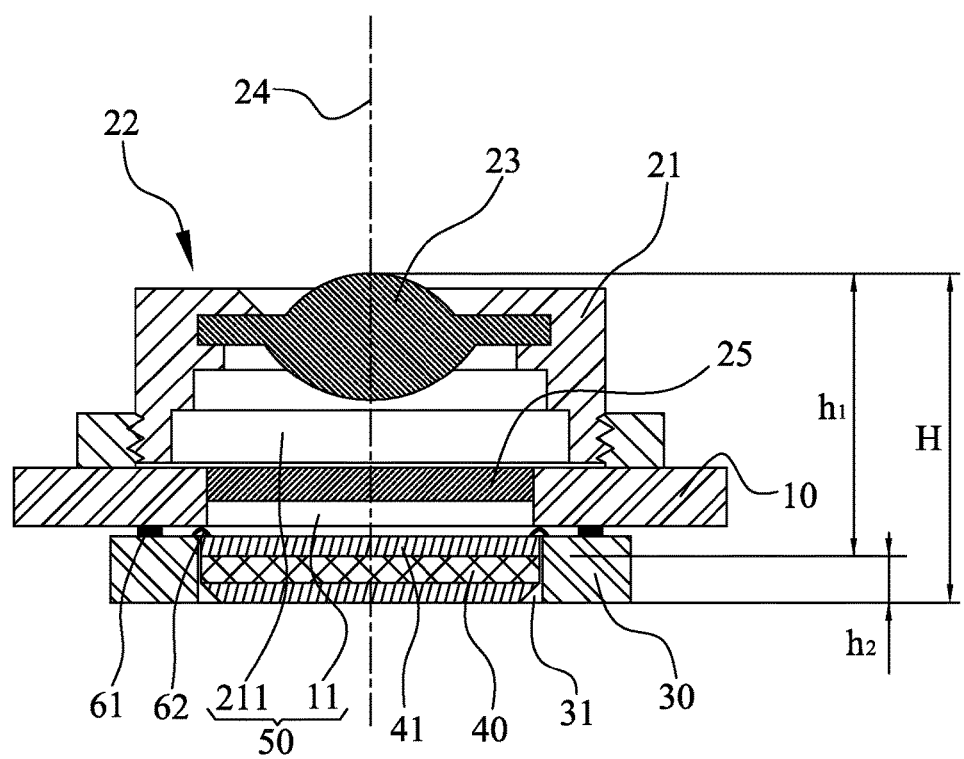
FIG. 3 is a sectional view of a camera module in accordance with a third embodiment of the present invention.

Referring to FIG. 3, a camera module 100 in accordance with a third embodiment of the present invention is shown. A difference between the first embodiment and the third embodiment is described as follows. The filter 25 is disposed in the nonopaque area 11 of the accommodating space 50, so the light beams through the lens assembly 22 are capable of passing through the filter 25. In the first embodiment, the second embodiment and the third embodiment, the filter 25 is disposed in the accommodating space 50 formed between the lens socket 21 and the main circuit board 10, so an extra height of the camera module 100 will be without being increased.

Figure 4:
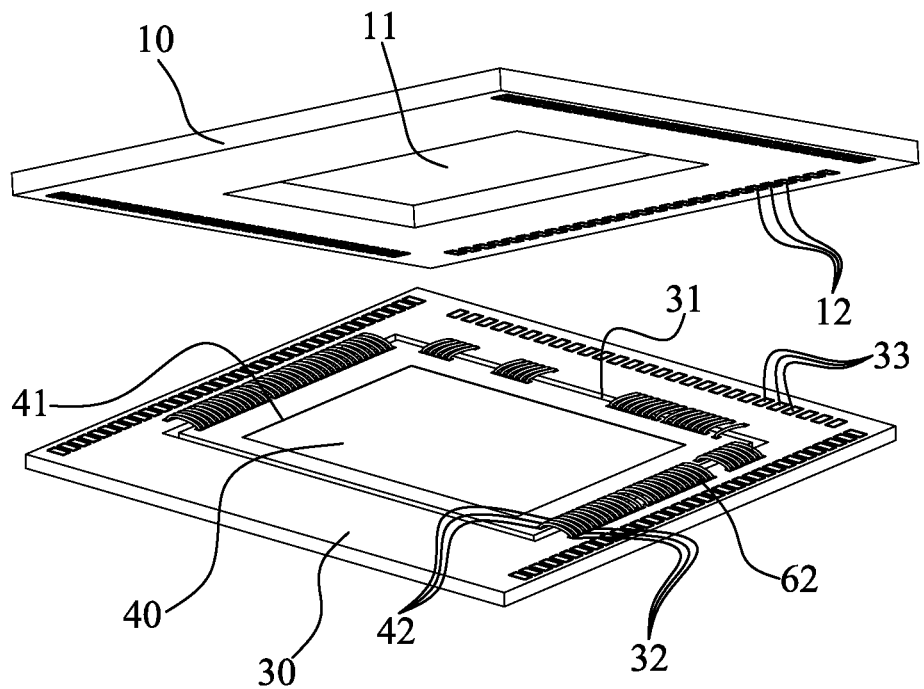
FIG. 4 is a partially exploded view of the camera module in accordance with the present invention.
Figure 5:
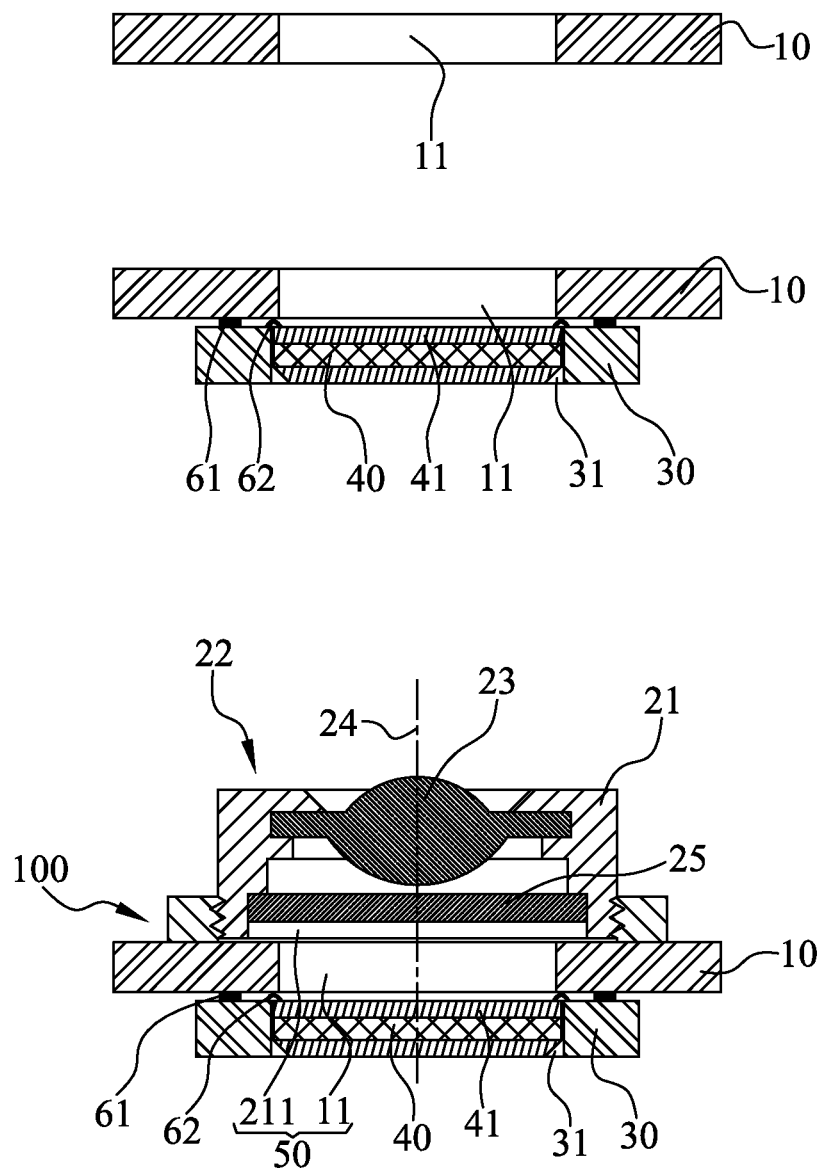
FIG. 5 shows sectional views of a process of manufacturing the camera module in accordance with the first embodiment of the present invention.
Figure 6:
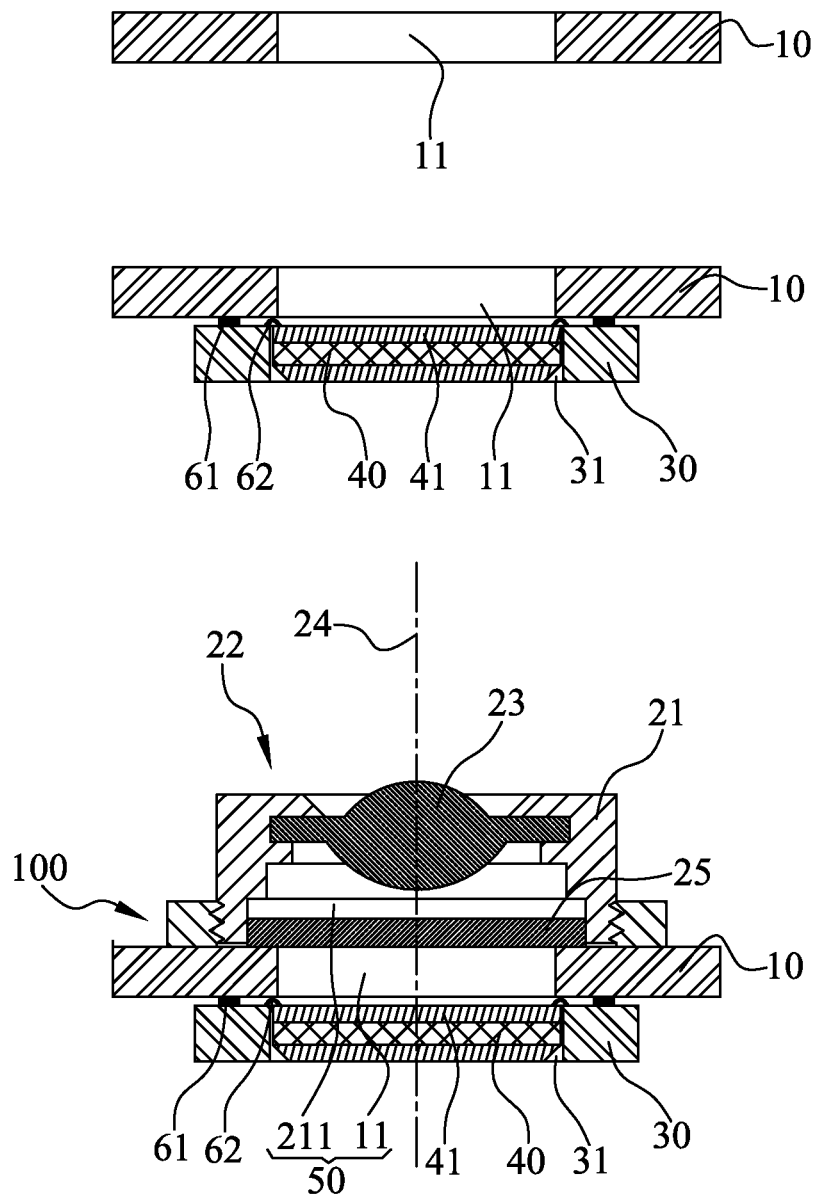
FIG. 6 shows sectional views of a process of manufacturing the camera module in accordance with the second embodiment of the present invention.
Figure 7:
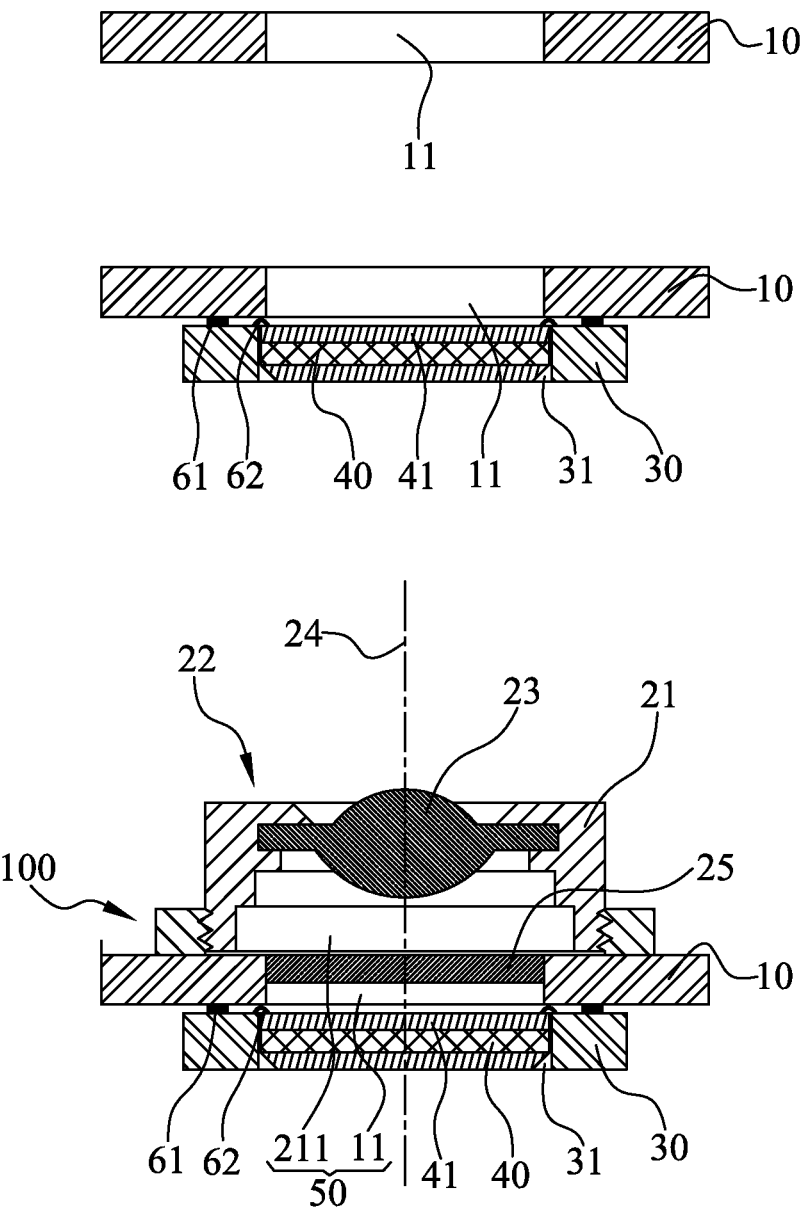
FIG. 7 shows sectional views of a process of manufacturing the camera module in accordance with the third embodiment of the present invention.
Figure 8:
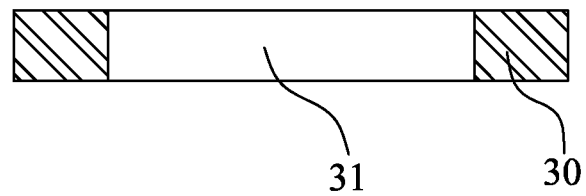
FIG. 8 shows sectional views of a process of an image-sensing chip fastened in a sub circuit board of the camera module in accordance with the present invention.
Figure 8:
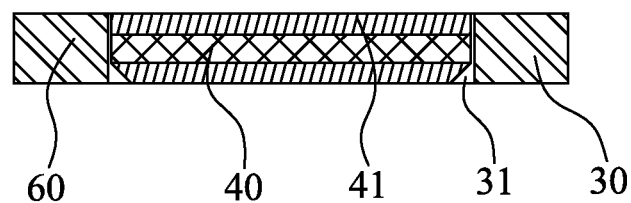
Figure 8:
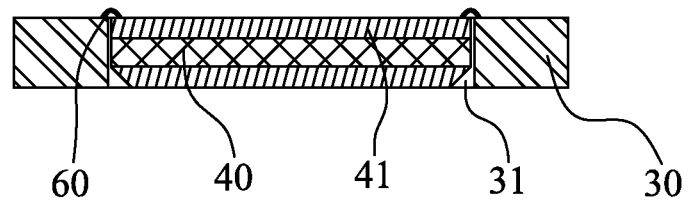
Figure 9:
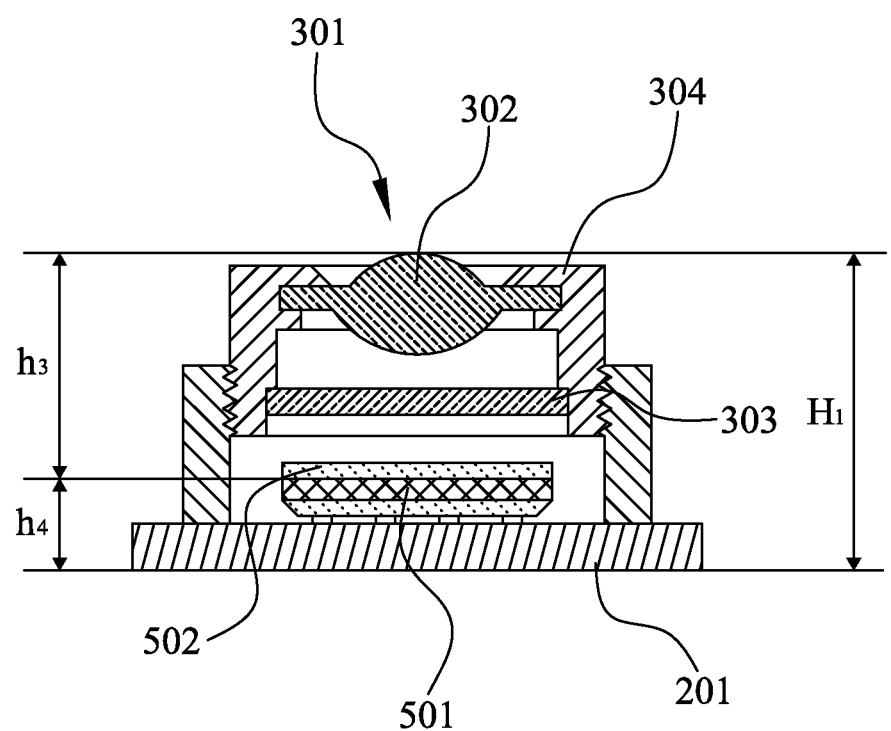
FIG. 9 is a sectional view of the camera module in a first prior art.
Figure 10:
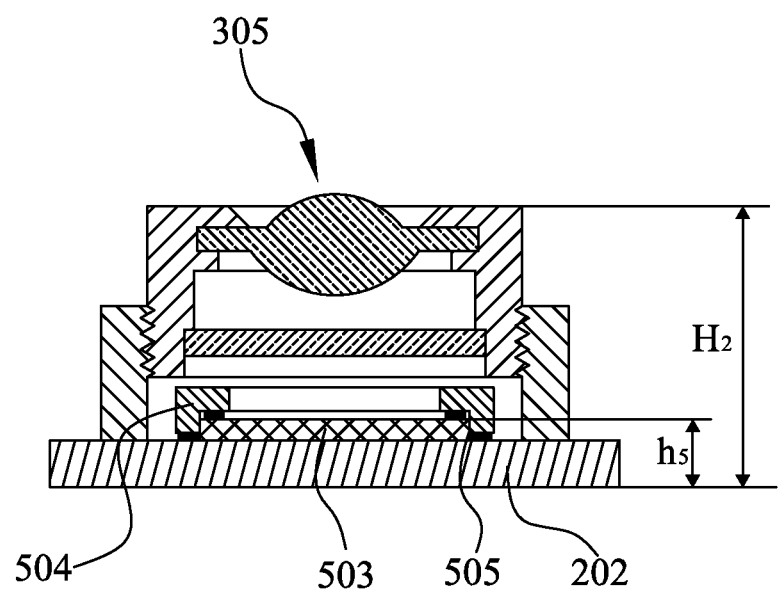
FIG. 10 is a sectional view of the camera module in a second prior art.
Figure 11:
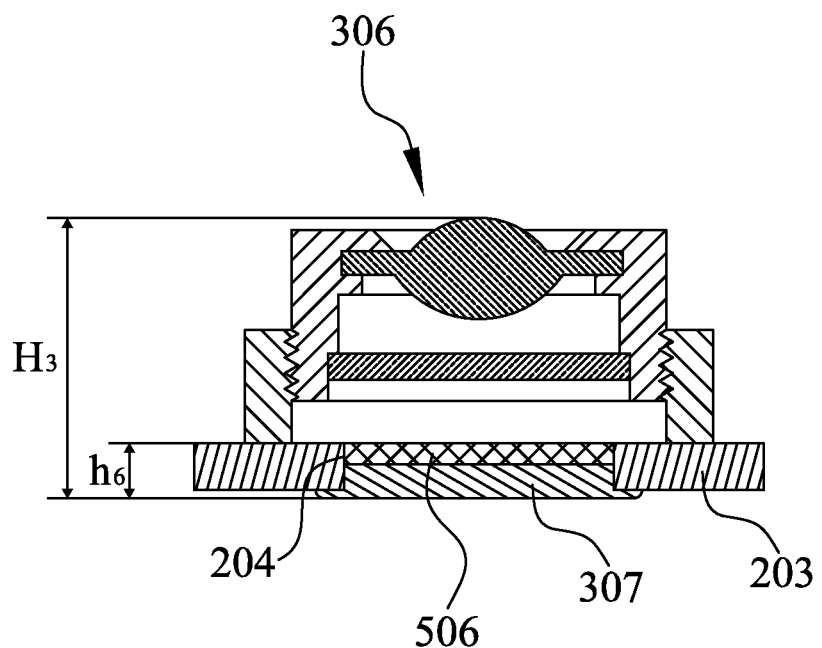
FIG. 11 is a sectional view of the camera module in a third prior art.

Referring to FIG. 4, in order to make the sub circuit board 30 electrically connected with the main circuit board 10, a top surface of the sub circuit board 30 is equipped with a plurality of first conductive pads 33. A bottom surface of the main circuit board 10 is equipped with a plurality of second conductive pads 12 corresponding to the first conductive pads 33. The first conductive pads 33 are electrically connected with the second conductive pads 12 by virtue of a first conductive material 61, so that the sub circuit board 30 is electrically connected with the main circuit board 10. The first conductive pads 33 are distributed on the top surface of the sub circuit board 30 adjacent to an outer periphery of the sub circuit board 30. The second conductive pads 12 are distributed at the bottom surface of the main circuit board 10 and adjacent to an inner periphery of the main circuit board 10.

Referring to FIG. 4, in order to make the image-sensing chip 40 electrically connected with the sub circuit board 30, the sub circuit board 30 defines an opening 31 penetrating through middles of the top surface and a bottom surface of the sub circuit board 30. The top surface of the sub circuit board 30 is equipped with a plurality of first connecting points 32 around the opening 31. The top surface of the image-sensing chip 40 is equipped with a plurality of second connecting points 42. The image-sensing chip 40 is embedded in the opening 31 to be fastened in the sub circuit board 30. The first connecting points 32 are electrically connected with the second connecting points 42 by virtue of second conductive materials 62. So that the image-sensing chip 40 is electrically connected with the sub circuit board 30 by a wire bonding technology. The second conductive materials 62 are metal wires.

The image-sensing chip 40 is packaged to form a package layer 41 outside the image-sensing chip 40 by a chip scale package technology. When the image-sensing chip 40 together with the package layer 41 is embedded in the opening 31, a top surface of the package layer 41 is flush with the top surface of the sub circuit board 30, and a bottom surface of the package layer 41 is flush with the bottom surface of the sub circuit board 30.

Referring to FIG. 1 to FIG. 8, specific steps of a method for manufacturing the camera module 100 in accordance with the present invention are described as follows.

Prepare the main circuit board 10. The main circuit board 10 defines the nonopaque area 11, and then predetermined electronic components (not shown) are soldered on the main circuit board 10.

Prepare the image-sensing chip 40 and the sub circuit board 30. The image-sensing chip 40 is mounted to and is electrically connected with the sub circuit board 30.

The sub circuit board 30 is adhered to the bottom surface of the main circuit board 10 and is electrically connected with the main circuit board 10, the sub circuit board 30 is adhered to a bottom surface of the main circuit board 10 and is electrically connected with the main circuit board 10, the image-sensing chip 40 is corresponding to the nonopaque area 11.

Prepare the lens socket 21 and the lens assembly 22. The lens assembly 22 is assembled in the lens socket 21. The lens socket 21 is mounted to the top surface of the main circuit board 10 to make the optical axis 24 formed by the lens assembly 22 pass through the nonopaque area 11.

In the step of the image-sensing chip 40 being mounted to the sub circuit board 30, the sub circuit board 30 defines the opening 31 penetrating through the middles of the top surface and the bottom surface of the sub circuit board 30. The top surface of the sub circuit board 30 defines a plurality of the first connecting points 32 around the opening 31. The image-sensing chip 40 is packaged by the chip scale package technology and is equipped with a plurality of the second connecting points 42 corresponding to the first connecting points 32. The image-sensing chip 40 together with the package layer 41 is embedded in the opening 31. The first connecting points 32 and the second connecting points 42 are processed by the wire bonding technology to make the first connecting points 32 electrically connected with the second connecting points 42.

After the lens assembly 22 is assembled in the lens socket 21, prepare the filter 25. The lens socket 21 defines the receiving chamber 211 penetrating through the top surface and the bottom surface of the lens socket 21. When the lens socket 21 is mounted on the top surface of the main circuit board 10, the receiving chamber 211 is communicated with the nonopaque area 11 to form the accommodating space 50. The filter 25 is disposed in the accommodating space 50.

As described above, the main circuit board 10 is disposed between the lens assembly 22 and the image-sensing chip 40 of the camera module 100, so the total height H of the camera module 100 is decreased. As a result, the camera module 100 easily satisfies the thickness requirement of the current portable electronic device. Furthermore, the image-sensing chip 40 is fastened in and is electrically connected with the sub circuit board 30 by the wire bonding technology, so that the image-sensing chip 40 is firmly mounted to the camera module 100.

What is claimed is:

1. A camera module, comprising:
a main circuit board defining a nonopaque area;
a lens socket mounted on a top surface of the main circuit board and covering the nonopaque area;
a lens assembly assembled in the lens socket, the lens assembly including at least one imaging lens which makes an optical axis formed by the lens assembly penetrate through the nonopaque area;
a sub circuit board adhered to a bottom surface of the main circuit board and electrically connected with the main circuit board; and
an image-sensing chip fastened in and electrically connected with the sub circuit board, the image-sensing chip being located at the optical axis.

2. The camera module as claimed in claim 1, wherein the nonopaque area is a perforation defined in a middle of the main circuit board.

3. The camera module as claimed in claim 1, further comprising a filter, the lens socket defining a receiving chamber penetrating through a top surface and a bottom surface of the lens socket, the receiving chamber being communicated with the nonopaque area to form an accommodating space, the filter being disposed in the accommodating space.

4. The camera module as claimed in claim 3, wherein the imaging lens is received in the receiving chamber, the filter is received in the receiving chamber of the accommodating space and is located under the imaging lens.

5. The camera module as claimed in claim 3, wherein the filter is disposed in the nonopaque area of the accommodating space.

6. The camera module as claimed in claim 1, wherein a top surface of the sub circuit board is equipped with a plurality of first conductive pads, the bottom surface of the main circuit board is equipped with a plurality of second conductive pads corresponding to the first conductive pads, the first conductive pads are electrically connected with the second conductive pads by virtue of a first conductive material.

7. The camera module as claimed in claim 6, wherein the first conductive pads are distributed on the top surface of sub circuit board adjacent to an outer periphery of the sub circuit board, the main circuit board is of a hollow frame shape, the second conductive pads are distributed at the bottom surface of the main circuit board and adjacent to an inner periphery of the main circuit board.

8. The camera module as claimed in claim 1, wherein the sub circuit board defines an opening penetrating through middles of a top surface and a bottom surface of the sub circuit board, the top surface of the sub circuit board is equipped with a plurality of first connecting points around the opening, a top surface of the image-sensing chip is equipped with a plurality of second connecting points, the image-sensing chip is embedded in the opening to be fastened in the sub circuit board, the first connecting points are electrically connected with the second connecting points by virtue of second conductive materials.

9. The camera module as claimed in claim 8, wherein the image-sensing chip is packaged to form a package layer outside the image-sensing chip, when the image-sensing chip together with the package layer is embedded in the opening, a top surface of the package layer is flush with the top surface of the sub circuit board.

10. The camera module as claimed in claim 9, wherein when the image-sensing chip together with the package layer is embedded in the opening, a bottom surface of the package layer is flush with the bottom surface of the sub circuit board.

11. The camera module as claimed in claim 8, wherein the second conductive materials are metal wires.

12. A method for manufacturing a camera module, comprising the steps of:

preparing a main circuit board, the main circuit board defining a nonopaque area;

preparing an image-sensing chip and a sub circuit board, the image-sensing chip being mounted to and being electrically connected with the sub circuit board, the sub circuit board being adhered to a bottom surface of the main circuit board and being electrically connected with the main circuit board, the image-sensing chip being corresponding to the nonopaque area; and preparing a lens socket and a lens assembly, the lens assembly being assembled in the lens socket, the lens socket being mounted to a top surface of the main circuit board to make an optical axis formed by the lens assembly pass through the nonopaque area.

13. The method for manufacturing the camera module as claimed in claim 12, wherein in the step of the image-sensing chip being mounted to the sub circuit board, the sub circuit board defines an opening penetrating through middles of a top surface and a bottom surface of the sub circuit board, the top surface of the sub circuit board defines a plurality of the first connecting points around the opening, the image-sensing chip is packaged by a chip scale package technology and is equipped with a plurality of the second connecting points, the image-sensing chip together with the package layer is embedded in the opening, the first connecting points and the second connecting points are processed by a wire bonding technology to make the first connecting points electrically connected with the second connecting points.

14. The method for manufacturing the camera module as claimed in claim 12, wherein a top surface of the sub circuit board is equipped with a plurality of first conductive pads, the bottom surface of the main circuit board is equipped with a plurality of second conductive pads corresponding to the first conductive pads, the first conductive pads are electrically connected with the second conductive pads by virtue of a first conductive material.

15. The method for manufacturing the camera module as claimed in claim 14, wherein the first conductive pads are distributed on the top surface of sub circuit board adjacent to an outer periphery of the sub circuit board, the main circuit board is of a hollow frame shape, the second conductive pads are distributed at the bottom surface of the main circuit board and adjacent to an inner periphery of the main circuit board.

16. The method for manufacturing the camera module as claimed in claim 12, wherein after the lens assembly is assembled in the lens socket, prepare a filter, the lens socket defines a receiving chamber penetrating through a top surface and a bottom surface of the lens socket, when the lens socket is mounted on the top surface of the main circuit board, the receiving chamber is communicated with the nonopaque area to form an accommodating space, the filter is disposed in the accommodating space.

17. The method for manufacturing the camera module as claimed in claim 16, wherein the lens assembly includes at least one imaging lens, the imaging lens is received in the receiving chamber, the filter is received in the receiving chamber of the accommodating space and is located under the imaging lens.

18. The method for manufacturing the camera module as claimed in claim 16, wherein the filter is disposed in the nonopaque area of the accommodating space.

* * * * *